(No Model.)

H. G. BORGFELDT.
BICYCLE BRAKE.

No. 584,621. Patented June 15, 1897.

WITNESSES:

INVENTOR
H. G. Borgfeldt.
BY
ATTORNEYS.

UNITED STATES PATENT OFFICE.

HEINRICH G. BORGFELDT, OF BROOKLYN, NEW YORK.

BICYCLE-BRAKE.

SPECIFICATION forming part of Letters Patent No. 584,621, dated June 15, 1897.

Application filed February 27, 1897. Serial No. 625,266. (No model.)

*To all whom it may concern:*

Be it known that I, HEINRICH G. BORGFELDT, of Brooklyn, in the county of Kings and State of New York, have invented a new and Improved Bicycle Brake Mechanism, of which the following is a full, clear, and exact description.

This invention relates particularly to bicycle-brakes in which means is provided for rocking the saddle to apply the brake to the wheel, and the object is to so construct the saddle-post that any of the well-known saddles may be employed therewith, and, further, to provide for attaching the saddle to the post forward of the pivotal point of the post.

I will describe a bicycle-brake embodying my invention and then point out the novel features in the appended claims.

Reference is to be had to the accompanying drawings, forming a part of this specification, in which similar characters of reference indicate corresponding parts in both views.

Figure 1:
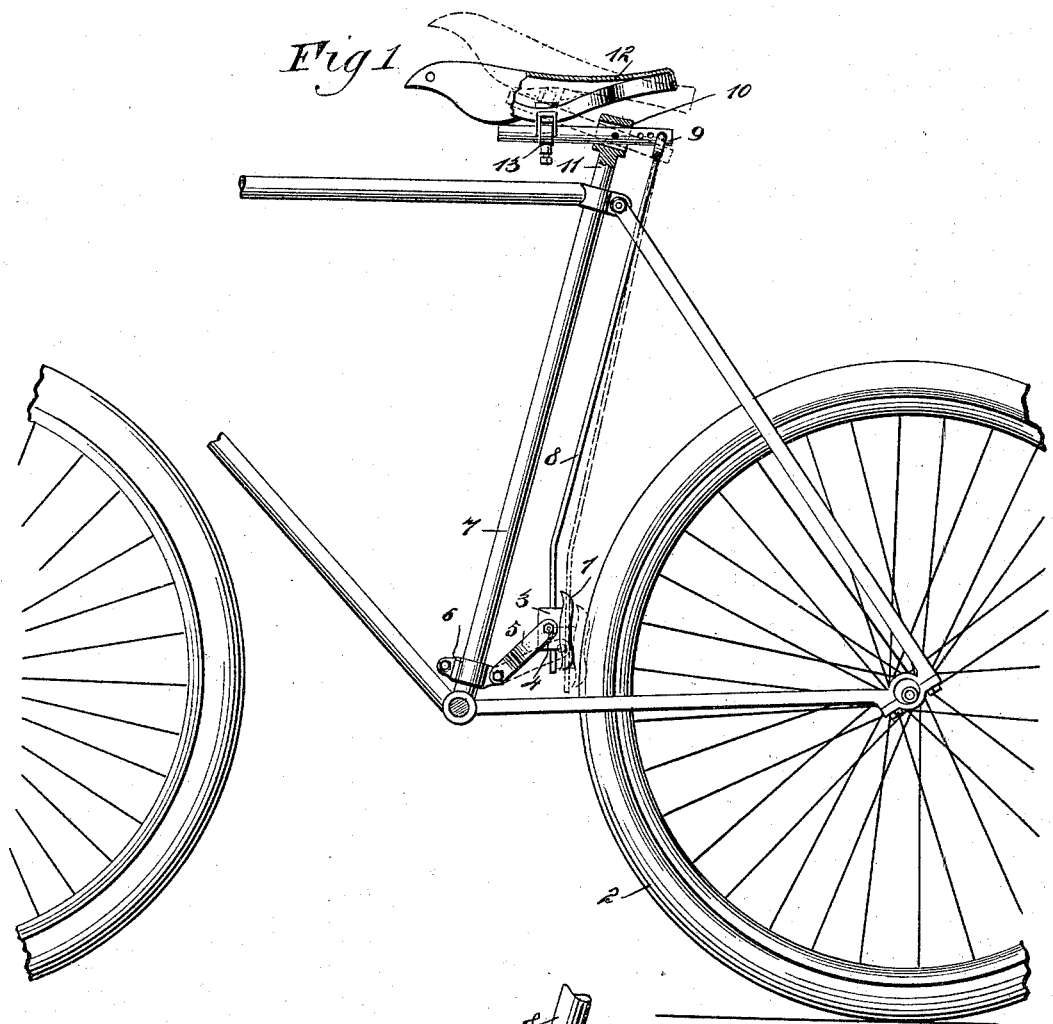
Figure 2:
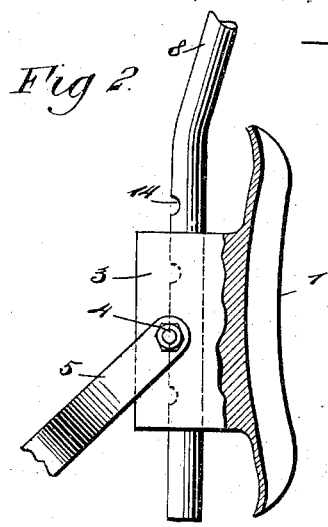

Figure 1 is a side elevation of a bicycle, showing my improved brake mechanism as applied thereto; and Fig. 2 is a partial section and partial elevation of an enlarged portion of the brake-shoe and its attaching devices.

Referring to the drawings, 1 designates the brake-shoe, of any suitable material, designed to engage with the tire of the rear wheel 2. This brake-shoe 1 is attached to a block 3, which has a pivotal connection 4 with a link 5, pivotally connected at its opposite end to a collar 6, adjustably secured on the king-post 7 of the bicycle-frame. From the block 3 a brake-rod 8 extends upward and has a pivotal connection at its upper end with the rear portion of a horizontally-disposed saddle-post 9. This saddle-post 9 is extended through a sleeve 10, formed on the upper end of a connecting-post 11, engaging with the king-post 7. The saddle-post 9 is pivoted within the sleeve 10, and the opening through said sleeve is somewhat larger than the diameter of the post, so that said post may be freely rocked, although the upper and lower walls of the sleeve 10 will limit its rocking movement in either direction.

Mounted on the post 9 is a saddle 12. As here shown, the saddle 12 has a clip connection 13 with the post 9 forward of its pivotal point. By connecting the saddle to the post forward of its pivotal point there will be no danger of a rider accidentally setting the brake, as the center of gravity of the rider will be forward of the rocking-point. When, however, it is desired to set the brake, the rider will rock the post 9 by throwing his weight rearward on the saddle, the rear end of the saddle being rearward of the pivotal point of the post.

The post 9, rearward of its pivotal point, will be provided with a series of holes, so that the rod 8 may be adjusted to give a more or less throw to the brake-shoe, and it will be noted that the brake-shoe will be applied to the wheel slightly above its axis, so that the momentum of the wheel will cause a wedge-like action between its tire and the brake-shoe. The lower portion of the rod 8 is provided with a series of notches 14, into either one of which the pivot 4 may be engaged when it is desired to adjust the brake-shoe relatively to the rod 8.

It is obvious that in the construction shown and described there is very little to get out of order. Should a part, however, get out of order, it may be easily and quickly repaired.

Having thus described my invention, I claim as new and desire to secure by Letters Patent—

1. A bicycle-brake, comprising a shoe adapted for engagement with the tire of the rear wheel, a rod extended upward from said shoe, a horizontally-disposed rocking saddle-post to which the upper end of the brake-rod is pivoted rearward of the pivotal point of the post, and a saddle attached to said post forward of its pivotal point, substantially as specified.

2. A bicycle-brake, comprising a swinging brake-shoe, a horizontally-disposed pivoted saddle-post, a rod extended from the brake-shoe to a pivotal connection with the saddle-post rearward of its pivotal point, and a saddle connected to the post forward of its pivotal point and having its rear portion extended rearward of the pivotal point of the post, substantially as specified.

3. A bicycle-brake comprising a swinging brake-shoe, a connecting-post for engagement with the king-post of the bicycle-frame, a sleeve on the upper end of said connecting-post, a horizontally-disposed saddle-post extended through the sleeve and pivoted therein, the inner diameter of said sleeve being larger than the diameter of the saddle-post, and a brake-rod extended from the brake-shoe to a connection with the saddle-post rearward of its pivotal point, substantially as specified.

HEINRICH G. BORGFELDT.

Witnesses:
JNO. M. RITTER,
C. R. FERGUSON.